Aug. 28, 1923.

R. E. HELLMUND 1,466,287

SYSTEM OF CONTROL

Filed March 11, 1919   5 Sheets-Sheet 1

| Switches → | 1 | 2 | 3 |
|---|---|---|---|
| Starting | o | o | |
| Running | o | o | o |

WITNESSES:
H. T. Shelhamer
W. R. Coley

INVENTOR
Rudolf E. Hellmund
BY
Wesley G. Carr
ATTORNEY

Aug. 28, 1923.

R. E. HELLMUND

1,466,287

SYSTEM OF CONTROL

Filed March 11, 1919  5 Sheets-Sheet 2

INVENTOR
Rudolf E. Hellmund

Aug. 28, 1923.

R. E. HELLMUND 1,466,287

SYSTEM OF CONTROL

Filed March 11, 1919     5 Sheets-Sheet 3

| Switches → | 1 | 2 | 3 |
|---|---|---|---|
| Starting | o | o | |
| Running | o | | o |

WITNESSES:
H. J. Shelhamer
W. R. Coley

INVENTOR
Rudolf E. Hellmund
BY
Wesley G. Carr
ATTORNEY

Aug. 28, 1923.

R. E. HELLMUND

SYSTEM OF CONTROL

Filed March 11, 1919    5 Sheets-Sheet 5

WITNESSES:
H. T. Shelhamer
W. R. Coley

INVENTOR
Rudolf E. Hellmund
BY
Uberley G. Carr
ATTORNEY

Patented Aug. 28, 1923.

1,466,287

UNITED STATES PATENT OFFICE.

RUDOLF E. HELLMUND, OF SWISSVALE, PENNSYLVANIA, ASSIGNOR TO WESTINGHOUSE ELECTRIC & MANUFACTURING COMPANY, A CORPORATION OF PENNSYLVANIA.

SYSTEM OF CONTROL.

Application filed March 11, 1919. Serial No. 281,955.

*To all whom it may concern:*

Be it known that I, RUDOLF E. HELLMUND, a citizen of the German Empire, and a resident of Swissvale, in the county of Allegheny and State of Pennsylvania, have invented a new and useful Improvement in Systems of Control, of which the following is a specification.

My invention relates to systems of control for alternating-current commutator motors, and it has for its object to provide relatively simple circuit arrangements that lend themselves readily toward effecting any desired speed regulation or power-factor adjustment, or both.

More specifically stated, it is one object of my invention to provide a single-phase commutator motor having an inducing field winding and an armature provided with working-circuit and exciting-circuit brushes, together with a suitable source of supply for the working brushes, and a mutual impedance associated with the working and the exciting circuits to produce different speed characteristics of the motor in accordance with the particular connection of the impedance.

In this way, the desired regulation of the motor circuits is satisfactorily secured, as will be evident from the following detailed description taken in conjunction with the accompanying drawings, wherein—

The present systems are principally intended for use in railway installations employing a standard low alternating-current voltage, such as 220 or 440 volts. However, although the advantages of comparative simplicity, involving the use of only a small number of pieces of low-capacity auxiliary apparatus, are particularly evident in such low-voltage systems, my invention may be profitably employed in conjunction with other types of distribution circuits.

Figure 1:
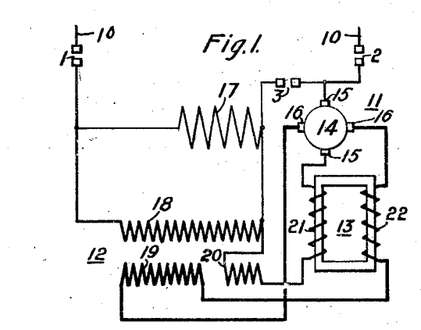
Figure 1 is a diagrammatic view of a system of control organized in accordance with one form of my invention.
Figure 5:
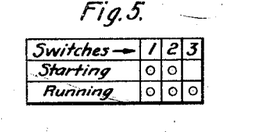
Figs. 5, 9 and 14 are identical sequence charts, of well-known form, serving to indicate the order of operation of the relatively small number of illustrated switches.

Referring to Fig. 1, the system shown comprises a suitable source of supply, such as a distribution circuit 10 of proper voltage, for the purpose of supplying energy through a plurality of switches 1, 2 and 3 in the order indicated by the sequence chart, Fig. 5, to an armature-excited, alternating-current commutator motor 11, through the agency of a small-capacity transformer 12, a mutual impedance 13 being associated with the working and the exciting circuits of the motor in a manner to be described.

The illustrated alternating-current motor comprises an armature 14, of the commutator type, provided with one or more sets of exciting-circuit brushes 15 and of working-circuit brushes 16, the two different sets of brushes being located in electrical quadrature relation, and an inducing field winding 17, the magnetizing axis of which is disposed in alinement with the magnetizing axis of the working-circuit brushes 16.

The transformer 12 is of relatively small capacity and comprises a primary winding 18 that is connected in parallel relation to the inducing field winding 17 to receive energy from the main source 10, a main secondary winding 19 that is connected to the working-circuit brushes 16, and an auxiliary secondary winding 20 that is connected in circuit with the exciting-circuit brushes 15.

The mutual impedance device 13 may be of any suitable form, being shown as comprising a plurality of coils 21 and 22 that are wound upon the legs of a common core and are respectively connected in circuit with the exciting brushes 15 and the working brushes 16 of the armature 14. The working circuit and the exciting circuit of the motor are thus inductively related through the mutual impedance 13 for the above-mentioned regulating purpose.

The illustrated motor is thus of the doubly-fed or transformer-conduction type having its inducing field winding designed for receiving the full voltage from the source of supply. The armature 14 cannot be built to withstand full supply-voltage, but is connected to receive a suitable portion thereof from the main secondary winding 19 of the transformer 12. The current traversing the exciting brushes 15 is induced by the rotation of the armature 14 in the flux of the inducing field winding 17, thereby producing a rotational voltage which may be compensated by a relatively low voltage supplied from the auxiliary secondary winding 20 of the transformer 12 to the exciting-circuit brushes 15.

The windings of the mutual impedance 13 may be connected in circuit in two different ways. If the magnetizing effects of the currents in the two coils during the motoring operation are differential or subtract the one from the other, then the machine will operate in accordance with a rather steep compound speed-current characteristic curve and a high power-factor will obtain even without the use of the auxiliary secondary transformer winding 20. Such a steep speed-characteristic curve is especially advantageous during regenerative operation where, as is the case in railway vehicles, a negative compound characteristic, that is, an increase of exciting field current to accompany a decrease of armature current and vice versa, is desired. On the other hand, if the currents in the two windings 21 and 22 of the mutual impedance are caused to combine additively, then the machine will run in accordance with a relatively flat speed characteristic, which is very desirable in some railway installations. The vectorial relation of the various currents and voltages in the system are shown in a general way in Figs. 19 to 21, inclusive, under various operating conditions, and will be described later by way of illustrating the previous statements with respect to the type of speed characteristic that is obtained during the operation of the various illustrated systems.

It will be understood that I have illustrated only the minimum number of switching devices that is necessary to bring out the important features of the present invention. During the starting operation of the motor, switches 1 and 2 are closed, as indicated in Fig. 5, whereby the motor is accelerated in accordance with a series characteristic, the armature current corresponding to the sum of the current in the inducing field winding 17 and in the primary winding 18 of the transformer 12. The circuit connections for starting may be briefly traced as follows: from the left-hand terminal of the source of supply 10, through switch 1 and the inducing field winding 17 and the primary transformer winding 18, in parallel relation, whence circuit is continued through the auxiliary secondary transformer winding 20, the impedance coil 21, the exciting-circuit brushes 15 and switch 2 to the opposite terminal of the source 10. At the same time, another circuit is established from one terminal of the main secondary winding 19 of the transformer 12 through the working-circuit brushes 16 of the motor and the impedance coil 22 to the other terminal of the transformer winding 19.

For running conditions, the switch 3 also is closed, whereby the right-hand terminal of the inducing field winding 17 is connected directly to the right-hand terminal of the source 10. In this way, the inducing field winding is connected across the source of supply, while a new separate-excitation circuit is formed simultaneously, including the exciting brushes 15, the impedance coil 21, the auxiliary transformer winding 20 and the switch 3.

Figure 2:
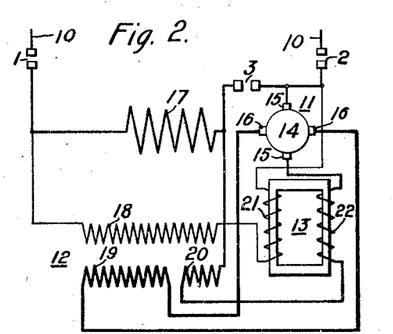
Figs. 2, 3, 4, 6, 7, 8, 10, 11, 12, 13, 15 and 18 are similar views of modifications of the invention.

The system shown in Fig. 2 differs from that of Fig. 1 in the direct connection of the main secondary transformer winding 19 to the working-circuit brushes 16; the connection of the primary transformer winding 18 and the impedance coil 21 in series relation across the main source of supply 10; and the connection of the auxiliary secondary transformer winding 20 in series relation with the inducing field winding 17, the impedance coil 22 and the exciting brushes 15 of the armature for starting the motor.

In the present instance, the inducing-field-winding current alone energizes the armature-exciting circuit during starting conditions when the switches 1 and 2 are closed; while, during running conditions, the switch 3 is closed to connect the inducing field winding directly across the source of supply 10, and the mutual impedance 13 is associated with the armature-exciting circuit and the primary winding of the transformer 12, in a manner analogous to that previously pointed out.

Figure 3:
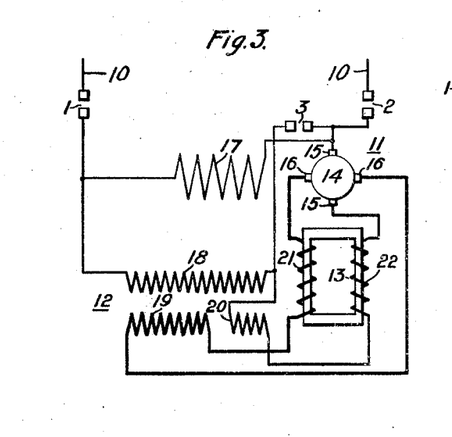

In Fig. 3, the inducing field winding 17 is shown as connected to the upper exciting-circuit brush 15, whereby the field winding is directly connected across the source 10 under starting conditions corresponding to the closure of switches 1 and 2, while the remaining circuits are similar to those shown in Fig. 1, with the exception of the interchange of the impedance coils 21 and 22.

In the system of Fig. 3, the current traversing the primary winding 18 of the transformer 12 is employed for starting the motor by traversing the exciting-circuit brushes 15, while the mutual impedance coils 21 and 22 again serve to inductively associate the working circuit of the armature with the exciting circuit thereof.

Figure 4:
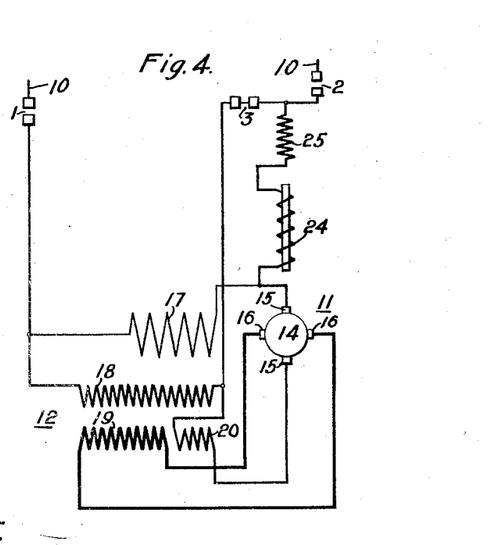

In Fig. 4, the inducing field winding 17 is again connected to the upper exciting-circuit brush 15, while the secondary windings 19 and 20 of the transformer 12 are respectively connected in circuit directly with the working-circuit brushes 16 and the exciting-circuit brushes 15. An inductive device 24 and a resistor 25 are connected in the main armature lead between the upper exciting brush 15 thereof and the switch 2. This arrangement serves equally well with those previously illustrated, employing the mutual impedance 13, for the desired regulating operation, since the armature-exciting current and the inducing-field-winding current both traverse the inductive device 24 and the resistor 25. For starting, current is supplied from the primary transformer winding 18 through the exciting-circuit brushes 15 of the armature, while, upon the closure of switch 3, during running conditions, the primary winding 18 is connected directly across the source of supply. It will be noted that the armature-exciting currents and the inducing-field-winding currents are cumulatively related in the circuit comprising the inductive device 24 and the resistor 25.

Figure 6:
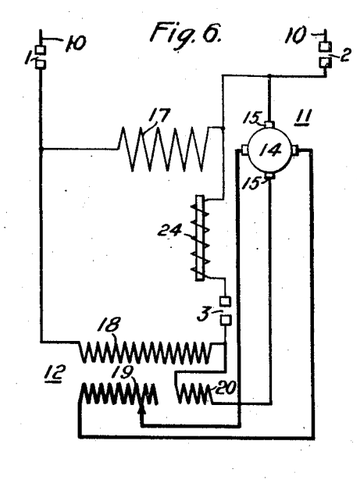

However, in Fig. 6, the inductive device 24 is connected to carry the difference of these two currents. This result is accomplished by connecting the running switch 3 and the inductive device 24 between the right-hand terminals of the inducing field winding 17 and the primary winding 18 of the transformer 12, instead of in the position that is shown in Fig. 4. Under such conditions, when the switch 3 is closed, an exciting current circulates through the exciting brushes 15, the auxiliary transformer winding 20 and the inductive device 24. A load current flows through the device 24 and the primary transformer winding 18. Thus, the inductive coil 24 carries two currents, having a direction and a magnitude that are dependent upon the relative characteristics of the inducing field winding 17, the transformer winding 18, the armature winding 14, etc., as will be understood.

Figure 7:
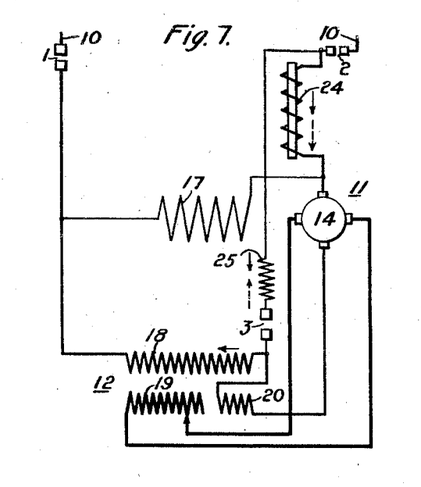

The system of Fig. 7 includes the connections of the inductive device 24 and the inducing field winding 17 in the same locations as shown in Fig. 4, while the resistor 25 is connected in the same position as the inductive device 24 in Fig. 6. Consequently, the inductive device 24 carries the sum of the armature-exciting and the inducing-field-winding currents, as indicated by the fact that the illustrated solid and dotted arrows point in the same direction, while these currents follow opposite paths in the resistor 25, as indicated by the corresponding arrows, when the switch 3 is closed during running conditions of the motor.

Figure 8:
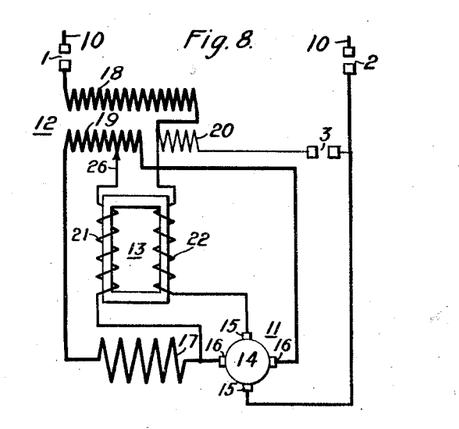
Figure 9:
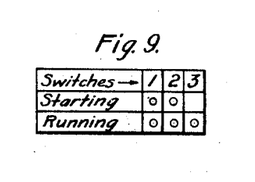

Referring to Fig. 8, the mutual impedance 13 is connected to inductively interlink the armature-exciting circuit (brushes 15) and the movable middle lead 26 of the illustrated doubly-fed motor, which employs the main secondary winding 19 of the transformer 12 for the purpose of supplying energy to both the inducing field winding 17 and the armature working circuit including the brushes 16.

Under starting conditions, with the switches 1 and 2 closed, a current traverses the primary transformer winding 18, the impedance coil 22 and the exciting-circuit brushes 15, while the inducing field winding 17 and the working-circuit brushes 16 are connected across the secondary transformer winding 19. As soon as the switch 3 is closed for the running condition, the primary transformer winding 18 and the auxiliary secondary transformer winding 20 are connected in series relation across the main source of supply, while the transformer winding 20 is also connected through the impedance coil 22 across the exciting-circuit brushes 15 to supply energy thereto.

Figure 10:
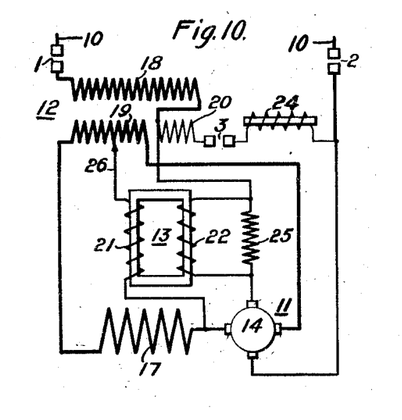

Fig. 10 adds, to the system of Fig. 8, the resistor 25 which is connected in parallel relation to the impedance coil 22 in the exciting circuit of the armature to render variable the ratio between the currents traversing the armature-exciting circuit and the middle lead of the doubly-fed motor; while the inductive device 24 is connected between the switches 2 and 3 in circuit with the auxiliary secondary transformer winding 20, thus providing a mutually inductive effect, as regards the current of the primary transformer winding 18 and the exciting current of the armature.

Figure 11:
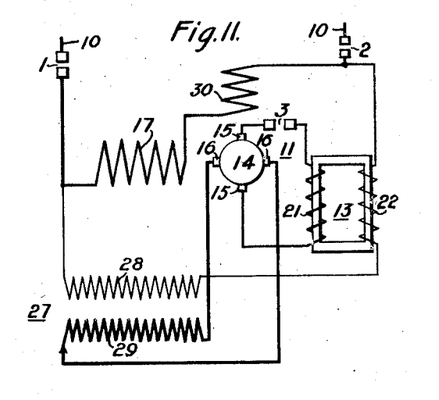

In Fig. 11, a stator-exciting field winding 30 is employed in addition to the exciting circuit including the armature brushes 15, the exciting field winding being connected in series relation with the inducing field winding 17 across the source of supply, when the switches 1 and 2 are closed. In addition, an auxiliary transformer 27 has its primary winding 28 connected in series relation with the impedance coil 22 across the source 10, while the secondary winding 29 of the transformer 27 is connected directly to the working-circuit brushes 16.

Under starting conditions, therefore, the stator exciting field winding 30 provides the entire field excitation for the motor, but, upon the closure of switch 3 during running conditions, the exciting-circuit brushes 15 are connected through the impedance coil 21, whereby a certain supplementary armature excitation is set up and, furthermore, the desired mutually inductive relation between the exciting current of the armature and the current traversing the primary transformer winding 28 obtains.

Figure 12:
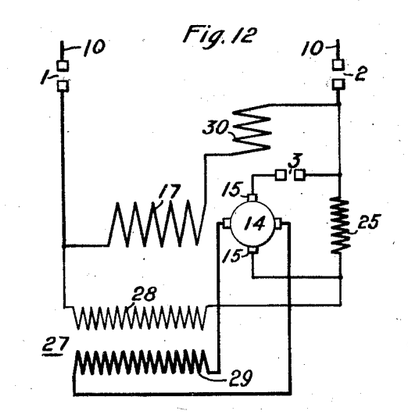

In Fig. 12, the resistor 25 is substituted for the two impedance coils 21 and 22 to again provide the desired mutually inductive effect, and the stator field winding 30 is also employed alone during starting conditions of the motor and together with the exciting-circuit brushes 15 during running conditions.

Figure 13:
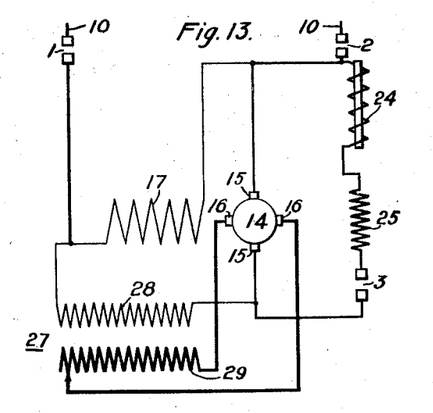
Figure 14:
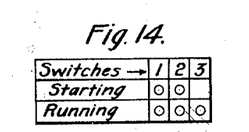

In Fig. 13, the stator field winding 30 is omitted. The primary transformer winding 28 is connected directly, through the exciting-circuit brushes 15, across the main source of supply during starting conditions of the motor, while the inductive device 24 and the resistor 25 are connected in the same location as the resistor 25 of Fig. 12, namely, across the exciting-circuit brushes 15, during running conditions, when the switch 3 is closed.

Figures 15, 16, 17, 18, 19:
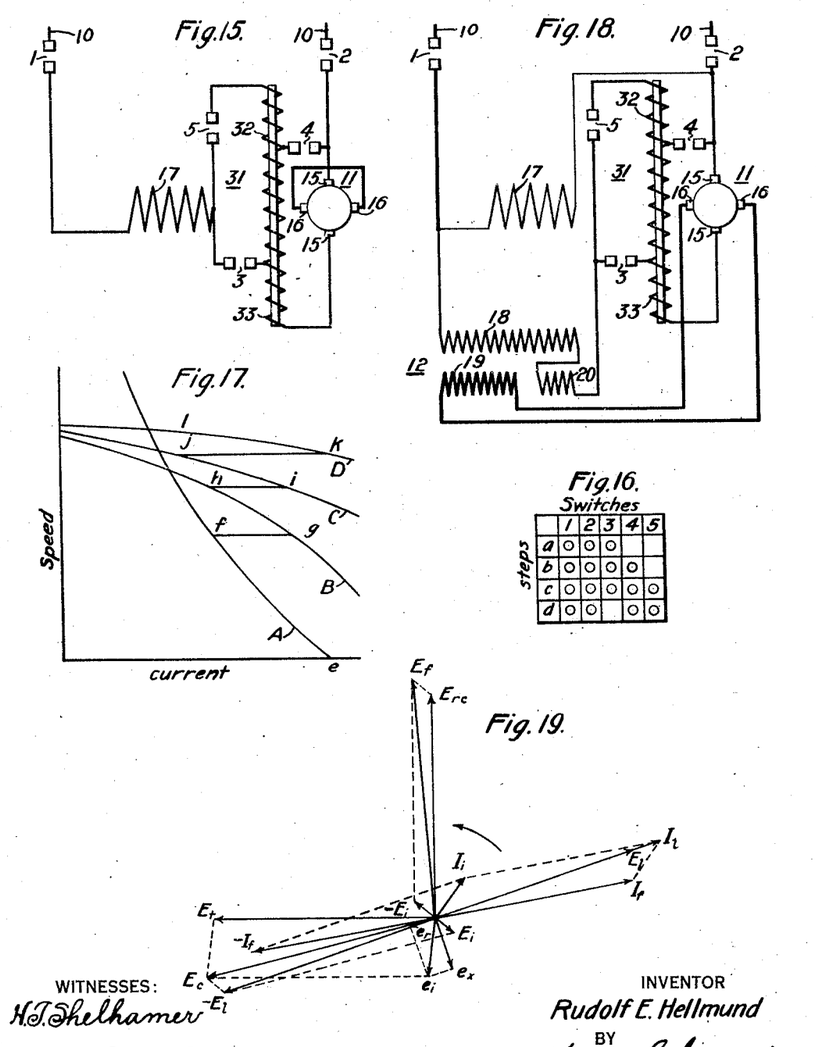
Fig. 16 is a sequence chart relating to the systems that are shown in Figs. 15 and 18.
Fig. 17 is a curve chart indicating the speed-current characteristics of those systems under various operating conditions.
Figs. 19 to 22, inclusive, are vector diagrams graphically setting forth the relations between various currents and voltages during the operation of the several systems.

In Fig. 15, a transformer motor is connected in circuit with a mutual inductance 31 that acts between the circuit of the inducing field winding 17 and the exciting circuit of the armature including the brushes 15. In this case, the working-circuit brushes 16 are short-circuited, energy being transferred to the working circuit solely through the transformer action of the inducing field winding 17 and the armature winding.

The inductive device 31 is employed in different ways during various stages of the motor operation, as determined by the order of operation of the switches 1 to 5, inclusive, that is indicated in the sequence chart, Fig. 16, for the purpose of providing different types of speed-current curves, whereby a convenient method of motor acceleration is afforded.

At the outset, switches 1, 2 and 3 are closed, as indicated by step $a$ of the sequence chart, Fig. 16, a circuit being thereby established from the left-hand terminal of the source of supply 10 through switch 1, the inducing field winding 17, switch 5, the lower section 33 of the inductive device 31, armature exciting brushes 15 and switch 2 to the right-hand terminal of the source of supply. Consequently, the section 33 of the inductive device 31 merely acts in the ordinary current-reducing capacity of inductance, thus providing a relatively steep speed-current characteristic for the motor, as shown in curve A, Fig. 17.

In step $b$ of the motor controller, switch 4 is also closed to directly connect the exciting-circuit brushes 15 across the lower section 33 and a portion of the upper section 32 of the inductive device 31. In this case, the magnetizing effect of the inductive device is substantially proportional to the difference of the load and the exciting currents of the motor, which gives a fairly steep compound characteristic to the motor, as shown by curve B.

In step $c$, the switch 5 is closed to short-circuit the upper section 32 of the inductive device 31, rendering the device substantially non-inductive by reason of the concurrent closure of the switches 3, 4 and 5 and the relation of current flows in the various portions of the inductive device. Under such conditions, a shunt speed-current characteristic is imparted to the motor, as illustrated by curve C.

For the final step $d$ of the controller, the switch 3 is opened to reverse the relative direction of the armature exciting currents and the inducing field winding or load current in the inductive device 31, thereby producing a relatively flat speed characteristic, as shown by curve D.

If the motor is accelerated through the recited steps in accordance with the broken line $efghijkl$ of Fig. 17, it is evident that a smooth acceleration, involving no current steps of unduly large size, may be obtained, although the final speed characteristic is very flat.

Fig. 18 shows the principles of Fig. 15 as applied to a doubly-fed motor, the same order of operation of the illustrated switches being employed for accelerating the motor. It will be noted that the inducing field winding 17 is connected directly across the source of supply 10 when the switches 1 and 2 are closed; while the exciting circuit for the motor is established, during running conditions, from the switch 4 through the exciting brushes 15, the inductive-coil section 33 and a portion of the section 32. The working-circuit brushes 16 are connected across the secondary winding 19 of the transformer 12. By reason of the similarity of operation of the system illustrated in Fig. 18 to that shown in Fig. 15, no further description is deemed necessary.

It has previously been mentioned that the illustrated mutual inductive or translating devices will provide a steep compound-speed-current characteristic for the motor if the magnetizing effect of the inductive device corresponds to the difference between the exciting and the load currents of the motor, whereas a rather flat curve is obtained when the magnetizing effect corresponds to the sum of those two currents. These statements may be graphically demonstrated by means of Figs. 19 to 22, inclusive. In Fig. 19, $I_l$ = the load current of the motor.
$I_f$ = the magnetizing current flowing through the exciting brushes 15 (of Fig. 15, for example). Therefore,
$I_i$ = the vectorial difference of these two currents or the magnetizing current flowing through the inductive coil when the magnetizing current in the inductive device is equal to the difference between the exciting and load currents of the motor, as in condition $b$ of the system shown in Figs. 15 and 16.
$E_1$ = the voltage impressed upon the motor circuit including the inducing field winding 17.

$E_t$ = the counter-electromotive force that is set up in the inducing field winding by the portion of the flux which threads the armature thereof.

$e_r$, $e_x$ and $e_i$ = respectively, the ohmic, the reactive and the resultant impedance drop that is caused by the line current in the inducing field winding, the ohmic voltage drop $e_r$ being in phase with, but extending oppositely to, the impressed motor voltage $E_1$.

$E_c$ = the resultant of $E_t$ and $e_i$, which is the voltage across the inducing-field-winding terminals.

The magnetizing current $I_i$ flowing in the inductive coil induces a voltage $E_i$, lagging substantially 90° in phase relation thereto. By adding the voltage $E_i$ to the inducing-field-winding voltage $E_c$, I obtain the total resultant counter-electromotive force of the motor, minus voltage $E_1$, which equals the total impressed motor voltage $E_1$.

The vector $E_{rc}$ represents the rotational voltage that is set up by the inducing-field-winding flux in the armature between the exciting brushes 15, and lags substantially 90° behind the counter-electromotive force $E_t$ of the inducing field winding.

By subtracting the inductive-device voltage $E_i$ from the voltage $E_{rc}$, I obtain the resultant exciting circuit voltage $E_f$, which leads the exciting current $I_i$ by an angle slightly less than 90°.

Figure 20:
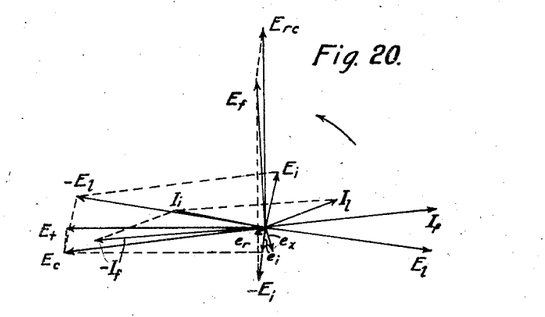

Fig. 20 shows a similar set of vectors, except that the load current $I_1$ has been assumed of a very much smaller value. This condition gives a relatively large inductive-coil magnetizing current $I_i$ and inductive-coil voltage $E_i$, which voltage extends in a direction close to that taken by the rotational voltage vector $E_{rc}$ and produces a much smaller voltage $E_f$ for the exciting circuit. By comparing the diagrams of Fig. 19 and Fig. 20, it will be seen that the field excitation is smaller and the motor speed is higher when light-load conditions obtain.

Figure 21:
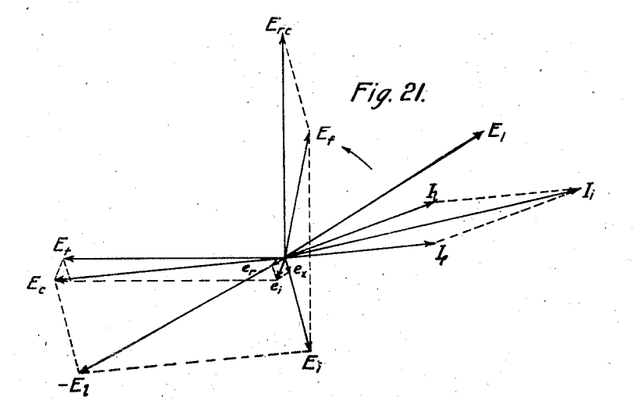
Figure 22:
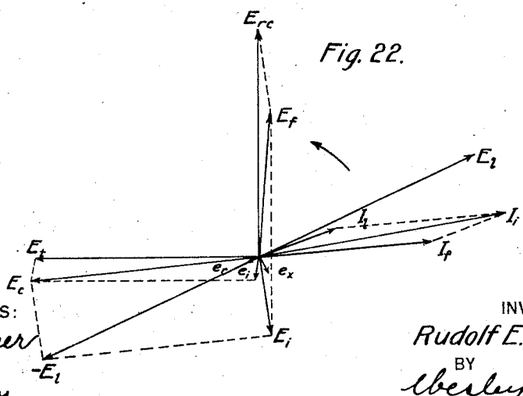

Figs. 21 and 22 illustrate the case wherein the magnetizing effect of the inductive device corresponds to the cumulative effect of the exciting and the load currents of the motor or, in the diagram, assuming that the load current $I_1$ and the exciting current $I_f$ both magnetize the inductive device in the same direction. In this case, it will be seen that the inductive-device voltage $E_i$ extends in approximately the opposite direction to the rotational voltage $E_{rc}$ and thus is practically subtracted therefrom to produce the exciting-circuit voltage $E_f$.

Upon comparison of Figs. 21 and 22, it is further evident that, with a decreased load current $I_1$, as shown in Fig. 22, $I_i$ and $E_i$ also decrease and, therefore, the exciting-circuit voltage $E_t$ is larger than in Fig. 21.

In other words, it is obvious that the exciting-circuit voltage $E_f$ and the corresponding current $I_f$ increase with a reduction in load, while the counter-electromotive force $E_t$ of the inducing field winding 17 remains substantially constant, thus providing a reduction of exciting field strength upon an increase of load and, therefore, a very flat or, in some cases, a rising speed-current characteristic.

I do not wish to be restricted to the specific circuit connections or arrangement of parts herein set forth, as various modifications thereof may be made without departing from the spirit and scope of my invention. I desire, therefore, that only such limitations shall be imposed as are indicated in the appended claims.

I claim as my invention:

1. The combination with an alternating-current commutator motor having an inducing field winding and an armature provided with working brushes and exciting brushes, of a main source of supply, an auxiliary transformer having a single primary winding energized therefrom and having a secondary winding connected in circuit with said exciting brushes and another secondary winding connected in circuit with said working brushes, and a mutual impedance having two inductively related coils respectively connected in circuit with the sets of brushes.

2. The combination with an alternating-current commutator motor having an inducing field winding and an armature provided with working brushes and exciting brushes, of a main source of supply, an auxiliary transformer having a primary winding connected across said source and a separate secondary winding connected to said working brushes, and a mutual impedance having two inductively related coils respectively connected in circuit with said secondary transformer winding and with said exciting brushes.

3. The combination with an alternating-current commutator motor having an inducing field winding and an armature provided with sets of working brushes and exciting brushes, of a main source of supply, an auxiliary transformer energized therefrom and having a winding associated with one of said sets of brushes, a mutual impedance having two inductively related coils respectively connected in circuit with the sets of brushes, said inducing winding being initially connected to said transformer and said impedance, and means for subsequently connecting said inducing winding directly across said source.

4. The combination with an alternating-current commutator motor having an inducing field winding and an armature provided with working brushes and exciting brushes, of a main source of supply, an auxiliary transformer energized therefrom and having two secondary windings, one of which is initially connected to the working-circuit brushes, a mutual impedance having two inductively related coils respectively connected in circuit with the sets of brushes, said inducing winding being initially connected in circuit with the other secondary winding and with one of said coils, and means for concurrently connecting said inducing winding across said source and connecting said other secondary winding across the exciting brushes.

5. The combination with an alternating-current commutator motor having an inducing field winding and an armature provided with working brushes and exciting brushes, of a main source of supply, an auxiliary transformer energized therefrom and having a primary winding connected in parallel relation to said inducing winding and having two secondary windings, one of which is initially connected to the working-circuit brushes, a mutual impedance having two inductively related coils respectively connected in circuit with the sets of brushes, said inducing winding and said primary transformer winding being initially connected in circuit with the other secondary winding and with one of said coils, and means for concurrently connecting said inducing winding and said primary transformer winding across said source and connecting said other secondary winding across the exciting brushes under running conditions of the motor.

In testimony whereof, I have hereunto subscribed my name this 1st day of March, 1919.

RUDOLF E. HELLMUND.